INVENTOR.
HELMAR SCHLEIN
BY
ATTORNEY

INVENTOR.
HELMAR SCHLEIN
BY
ATTORNEY

FIG. 9

INVENTOR.
HELMAR SCHLEIN
BY
ATTORNEY

United States Patent Office 3,420,764
Patented Jan. 7, 1969

3,420,764
ELECTROCHEMICAL ANALYSIS SYSTEM
Helmar Schlein, Reseda, Calif., assignor to North American Rockwell Corporation, a corporation of Delaware
Filed Mar. 16, 1964, Ser. No. 351,931
U.S. Cl. 204—195     24 Claims
Int. Cl. B01k 3/02

ABSTRACT OF THE DISCLOSURE

An electrochemical cell controller is described in which a ramp voltage of variable slope and timing pulses is generated. The timing pulse initiates a relay closure activating a dropping mercury electrode. A finite adjustable time after the timing pulse another pulse is generated. Just prior to this event a current measurement is made on the cell and its value is stored. During this second pulse another measurement is made and this difference between these two current measurements is then detected. In this manner the controller obtains the differential of the voltage current relationship in the cell. This type of measurement ignores the Faraday current in the cell and only conduction current is measured.

---

The present invention relates to systems for the electrochemical analysis of solutions and more particularly to apparatus of the polarographic type useful with a variety of electrodes and capable of operation in a plurality of modes.

Apparatus of the polarographic type capable of precision analytical work preferably utilize a cell having a dropping mercury electrode, a reference electrode and an auxiliary electrode together with control and measuring instrumentation. Such three electrode polarographic devices are particularly useful for the analysis of solutions having high electrical resistances and provide accurate potential and current measurements without many of the difficulties associated with mercury pool electrode types. In such devices a polarizing voltage is applied to the auxiliary electrode and the change in current in the cell resulting from the polarizing voltage is monitored at the indicator electrode. The voltage at which electrolysis takes place is indicative of the nature of the reacting substance, while the current observed is a function of its concentration.

The present invention is directed to improved devices for electrochemical analysis which provide for high sensitivity and resolution. By means of the present invention concentrations of the order of $10^{-7}$ molar may be detected. Such a sensitivity is commensurate with that attainable with the most complex prior art polarographic apparatus. Further, resolution of waves 50 millivolts apart may be accomplished by the present invention. This sensitivity and resolution is attained by the utilization of conventional electronic components in the system of the present invention which provide for high reliability and decreased cost. Further, the system of the present invention may utilize either a dropping mercury electrode or a solid electrode, thereby materially increasing the number and type of analyses which may be made and also provides for operation in various modes thereby increasing versatility of use.

The system of the present invention eliminates the high frequency techniques associated with prior art polarographic apparatus of comparable sensitivity and resolution and provides for decreased measurement times.

It is the primary object of the present invention to provide apparatus for electrochemical analysis utilizing either a dropping electrode or a solid electrode by which high sensitivity may be obtained and which does not require the use of alternating currents in the cell or measurement circuits.

Another object of the presnt invntion is to provide a system for electrochemical analysis which may be utilized in a plurality of operating modes, including derivative pulse, fast sweep, normal pulse or normal polarographic modes.

It is a further object of the present invention to provide synchronized electrochemical analysis instrumentation in which a ramp voltage alone or in various combinations with a voltage pulse is applied to a cell a predetermined time after operation of the dropping electrode to obtain analytical determinations of the constituents of the electrolyte in the cell.

It is another object of the present invention to provide a controller for an electrochemical analysis device which is simple in operation and does not require the use of high frequency currents or filter components.

Another object of the present invention is to provide apparatus for electrochemical analysis in which the monitoring of the current flowing in the cell is synchronized with an A.C. voltage source to increase the accuracy of the measurements.

These and other objects of the present invention will become more apparent from the following detailed description of various embodiments of the present invention taken together with the drawings, hereby made a part thereof, in which:

FIG. 3 shows the general wave forms for the embodiment of FIGS. 1 and 2;

FIG. 5 shows an exaggerated wave form with superimposed A.C. ripple;

FIG. 7 shows the output for the normal polarographic operating mode of the embodiment of FIGS. 1 and 2;

FIG. 10 shows the sequential operation of the embodiment of FIGS. 8 and 9 for the normal pulse mode of operation.

The present invention provides an electrochemical analysis system having a plurality of modes of operation.

The first derivative pulse mode, utilizes a ramp voltage having a superimposed substantially square wave pulse applied to an auxiliary electrode of an electrolytic cell in synchronism with the dropping electrode action, wherein the current flow in the cell associated with the electrode action is monitored at precise time intervals with respect to the superimposed wave form. The second, fast sweep mode, utilizes a ramp voltage applied to a cell in synchronism with the dropping electrode action wherein the change in the current flow in the cell is monitored in response to the application of a varying voltage signal. A third mode in which the system of the present invention may be operated is the conventional polarographic mode. A fourth mode in which the system may operate is the normal pulse mode, i.e., a mode where the pulses applied to the cell have an increasing amplitude.

The modes of operation of the present invention, i.e., derivative pulse mode, fast sweep mode, normal polarographic mode, and normal pulse mode, will each be described in detail in the various embodiments exemplifying the present invention.

Derivative pulse mode

Figure 1:
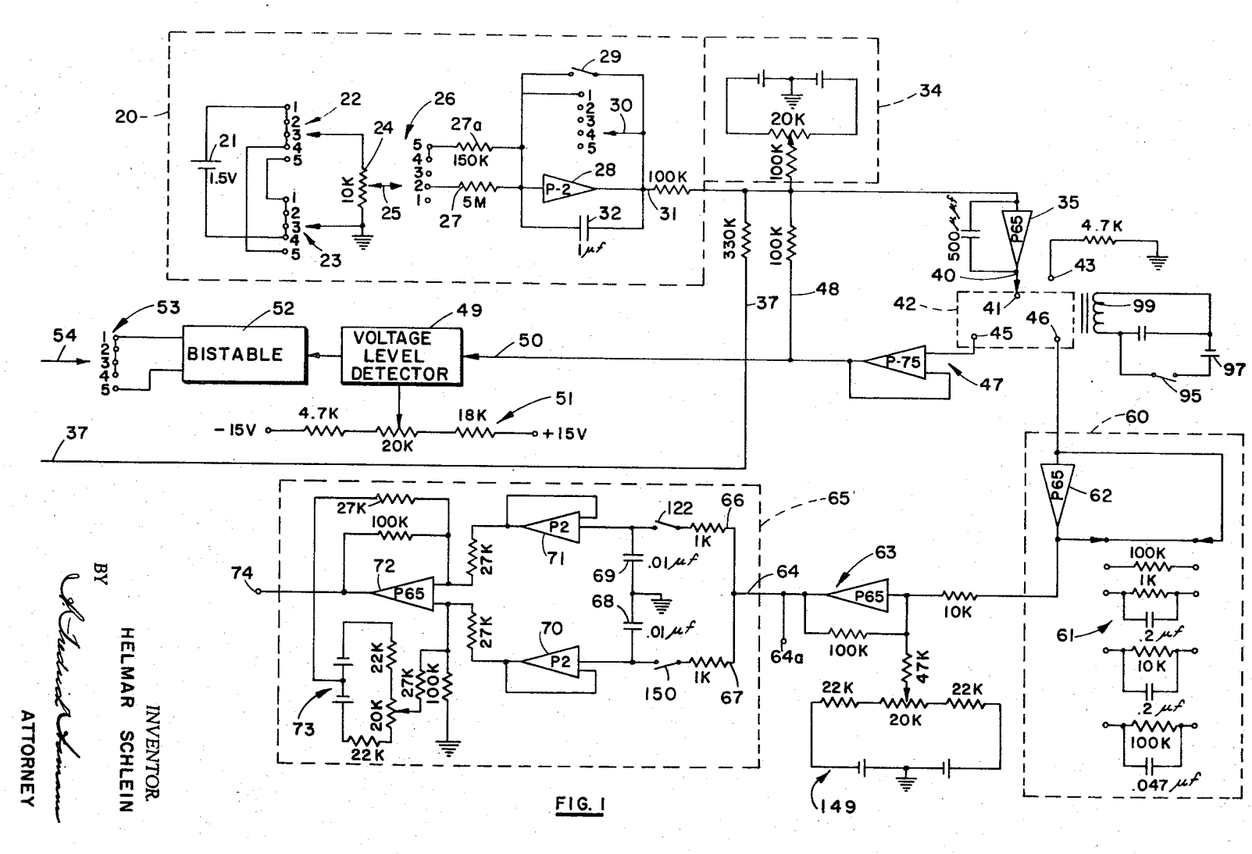
FIG. 1 is a circuit diagram of a portion of one embodiment of the system of the present invention.
Figure 2:
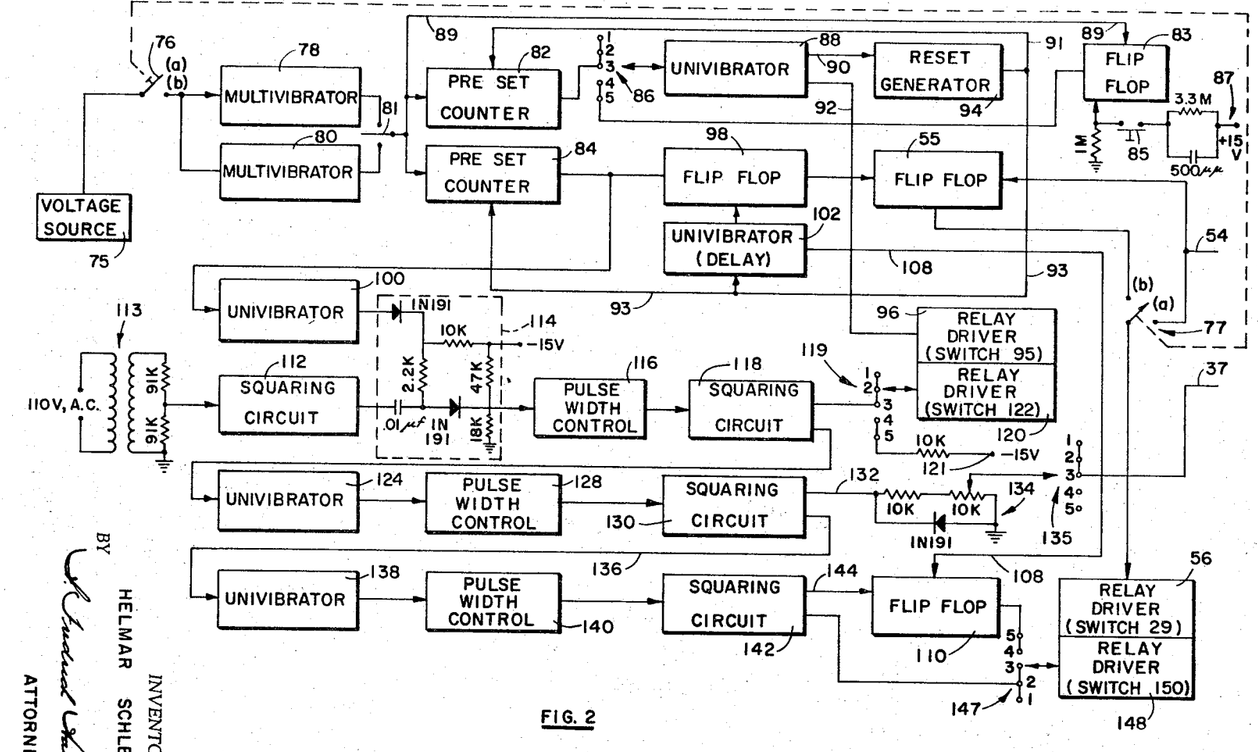
FIG. 2 is a detailed circuit diagram of the controller portion of the embodiment of FIG. 1.

Referring to the drawings in detail, FIGS. 1 and 2 show the circuit of one embodiment of the present invention. A ramp voltage generator indicated generally at 20 (see FIG. 1) includes a voltage source 21 connected across the contacts of each of two switches 22 and 23 having five positions. The contacts of switches 22 and 23 are interconnected so that positions 1–4 will apply a positive voltage to the movable contact and position 5 will apply a negative voltage to the movable contact. The movable contacts of switches 22 and 23 are connected across a potentiometer 24, one side of which is grounded, with the wiper 25 being connected to the movable contact of a five-position switch 26. The potentiometer 24 functions as a voltage rate control, which voltage is applied to an amplifier 28 through one of two resistances 27 and 27a depending upon the position of switch 26. The values of the resistances 27 and 27a are selected so that the rate of change of the applied voltage is modified depending upon the position of switch 26. Relay contact 29 and switch 30 are each connected across the amplifier 28, with switch 30 being a five-position switch ganged for operation with switches 22, 23 and 26, as well as others as explained hereinafter. When contact 29 and switch 30 are open, the voltage from source 21 is applied to amplifier 28, which is connected in the integrating mode to supply an output at 31 which is a ramp voltage. The output at 31 is shown as curve 33 in FIG. 3(a) and is connected to the input of potentiostat amplifier 35. The ramp voltage applied to auxiliary electrode 41 through amplifier 35 is essentially linear with time.

Circuit 34 consisting of a center tapped battery connected across a potentiometer, the wiper of which is also connected to the input of amplifier 35, furnishes a voltage which may be added to the other inputs at the summing point of amplifier 35, so that the potential of electrode 41 may start at any preselected value.

A square pulse 36 (see FIG. 3(b)) is applied over lead 37, as explained in detail hereinafter, so that the signal applied to amplifier 35 during the derivative pulse mode of operation is a ramp voltage with a superimposed or added square wave as shown in FIG. 3(c). Amplifier 35, which is of the inverting type, is connected to a two-position switch 40. Switch 40 during operation is connected to auxiliary electrode 41 of the electrolytic cell 42, with the second switch position 43 being a stand-by position. The reference electrode 45, which may be any of the standard high impedance reference electrodes such as a silver-silver chloride electrode of the wick type as used with electronic pH meters, is connected through a standard amplifier circuit 47 which provides a feedback voltage signal through lead 48 to the summing point of amplifier 35.

The reference electrode voltage on lead 48 is connected to detector or bistable 49 through lead 50, the detector 49 being utilized as a voltage level detector where the voltage level detected is determined by the setting of voltage level control 51. When the predetermined voltage level is reached by the ramp voltage, detector 49 generates an output signal which triggers bistable 52. The outputs of bistable 52, which are voltage level shifts, are connected to the contacts of a five-position switch 53. The movable contact 54 of switch 53 is connected through a flip-flop 55 to a relay driver 56 (see FIG. 2) which operates contact 29 so that it is closed and the ramp stopped and reset when a voltage level, as determined by control 51, has been reached.

The indicator electrode 46 (see FIG. 1) of cell 42 is preferably of the dropping mercury type, but may also be a solid electrode, e.g., platinum or any other standard electrode, as explained hereinafter. Electrode 46 is connected to current measuring circuit 60 which connects any one of a plurality of scaling circuits 61 across amplifier 62. The output of the current measuring circuit 60 is connected through an amplifier circuit 63 to the input 64 of a selective voltage memorizing circuit, indicated generally at 65, the function of which will be more apparent hereinafter.

Figure 4:
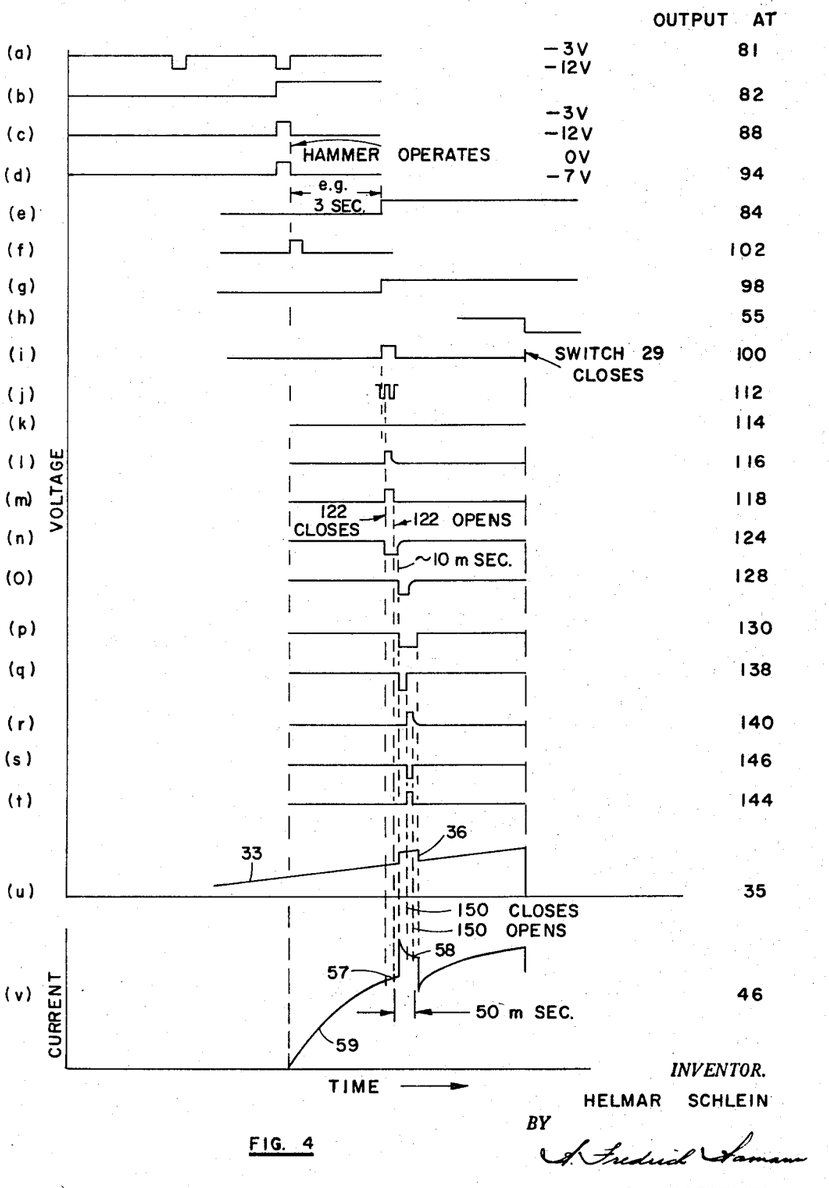
FIG. 4 shows the sequential wave forms for the derivative pulse mode of operation of the embodiment of FIGS. 1 and 2.

Referring now in detail to FIG. 2, a voltage source 75 is connected through switch 76 to multivibrators 78 and 80, where the output of the multivibrators is a series of pulses at about ½ second intervals or a series of pulses at about one second intervals, respectively (see FIG. 4(a)). Either of these outputs is connected through two-position switch 81 to standard preset counters 82 and 84. The preset counter 82, which may be adjusted to generate an output with any preselected time interval in this embodiment, is responsive to the signal at 81. The output of counter 82 (see FIG. 4(b)) is connected through the contacts 1–3 of switch 86 to univibrator 88. Circuit 88 has two outputs 90 and 92. The signal on output 92 (see FIG. 4(c)) actuates relay driver 96 and is of sufficient duration to operate relay 95. The relay driver 96 controls the position of switch 95 (see FIG. 1) so that a voltage source 97 is connected across the coil 99 of the hammer mechanism for the dropping mercury electrode. Thus, upon energization of relay driver 96, a hammer is driven against the capillary of the dropping mercury electrode 46 to force a drop from the electrode.

The output signal on 90 is the complement of the signal shown in FIG. 4(c) and energizes reset generator 94 which generates a signal as shown in FIG. 4(d). The output signal of 94 on leads 91 and 93 are utilized to reset both counters 82 and 84. The counter 84 is set for a period less than the period of counter 82, i.e., 3 seconds in this embodiment, and generates an output signal 3 seconds after the occurrence of the hammer signal output generated by counter 82 as shown in FIG. 4(e). The voltage level shift output of counter 84 is connected to a flip-flop 98 and to a univibrator 100 functioning as a gate control. The sequencing circuit 98 will generate an output signal in response to the signal from counter 84 provided the output signal on lead 93 from reset generator 94 has passed through univibrator or delay 102 (see FIG. 4(f)). Circuit 98 in turn has an output signal, as shown in FIG. 4(g), which sets a flip-flop circuit 55 if a signal on lead 54 has been previously applied. The circuit 55 will generate an output (see FIG. 4(h)) on lead 106 in response to a signal from 98 and a voltage level shift at 54 which will drive relay driver 56 to close switch 29.

The delay circuit 102 also has an output 108 which is connected to a flip-flop circuit 110, the operation of which will be explained hereinafter with respect to the fast sweep mode of operation.

The output signal of counter 84 (FIG. 4(e)) is connected to a means for synchronizing the current measurement taking operations of the invention, as explained hereinafter, with the 60 cycle A.C. source. This means comprises a univibrator 100 functioning as a gate control circlosed position; relay 150 is normally open; and switch 81 is connected to either multivibrator 78 or 80.

When the five-position switches are moved to position 4 for fast sweep operation, the ramp voltage is connected to the amplifier 35 and is applied to the cell, since switch 29 is open. After the ramp has reached its preset limit as determined by circuit 51, a voltage level shift is applied to circuit 55 and, if circuit 55 was previously energized by a signal from 98, the voltage level on 106 will change, relay driver 56 will be activated and switch 29 will be closed, stopping the ramp. If no previous signal from 98 energized circuit 55 then, upon initiating a fast sweep operating sequence by pushing button 85, circuit 98 will be energized as explained below and the output 106 of circuit 55 will change to energize relay driver 56 to open relay 29. In either circumstance, relay 29 will be closed at the latest after one ramp voltage sweep, and this is considered here as the initial condition for the fast sweep operating mode.

Figure 6:
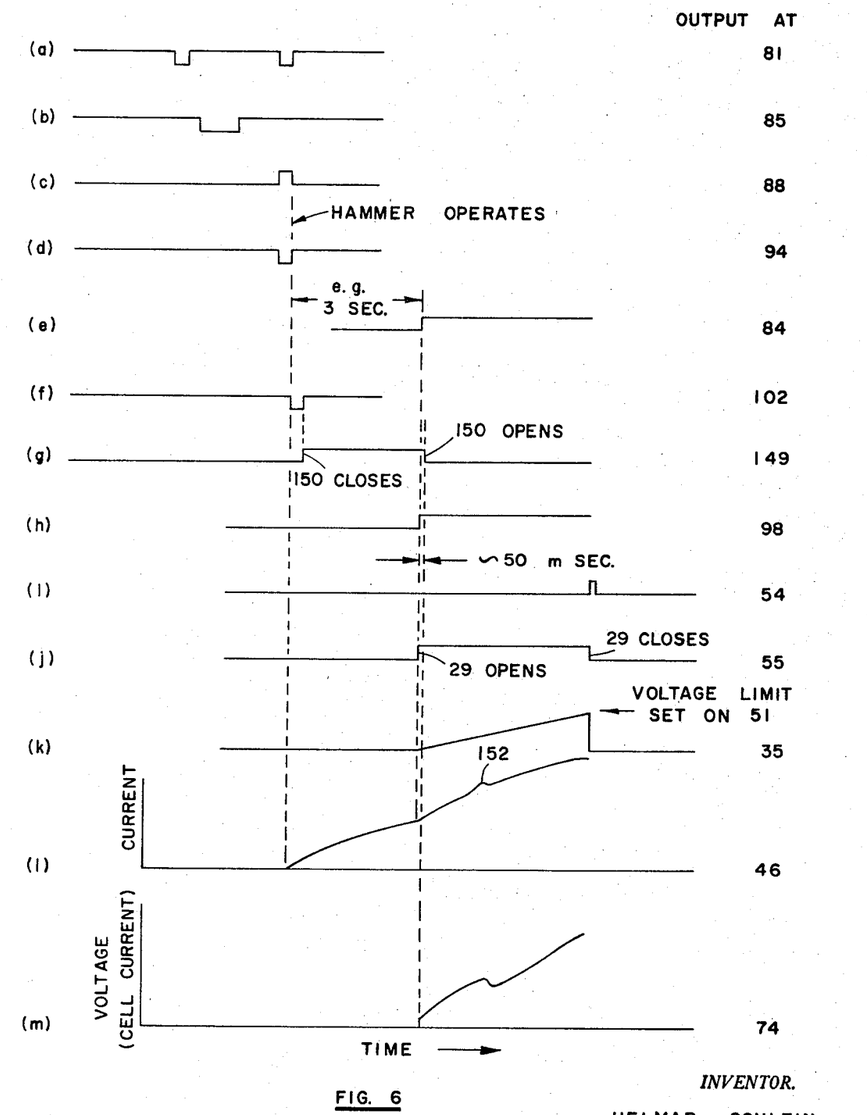
FIG. 6 shows the sequential wave forms for the fast-sweep mode of operation of the embodiment of FIGS. 1 and 2.

Switch 76, being closed, applies a voltage to either multivibrator 78 or 80 and the proper pulse timing is selected by switch 81. The signal at switch 81, FIG. 6(a), is applied to preset counters 82 and 84, and to flip-flop circuit 83. Since switch 86 is connected to contact 4, the output of preset counter 82 is not connected with the system in this operating mode. The operating mode is initiated by operating push button 85 which connects voltage source 87 to flip-flop 83 during the time button 85 is depressed, as shown in FIG. 6(b). This pulse sets circuit 83. A subsequent signal over lead 89 from switch 81 then results in circuit 83 generating a voltage level shift output which is applied through switch 86 to univibrator 88. Thus, the hammer is not operated directly by the push button 85 but this circuit arrangement allows the hammer to be synchronized with the signal which drives the preset counter 84. Output 92 of univibrator 88 operates relay driver 96 which energizes the hammer to knock off a mercury drop from the dropping electrode 46 of cell 42, as explained above. Circuits 84, 100, 114, 116, 118, 124, 128, 130, 138, 140 and 142 operate in the same manner as described above, the output signals being shown, respectively, in FIGS. 4(i) through (s). In this sequence, however, which is similar to that described with respect to FIG. 4, circuit 118 is not connected through switch 119 to relay driver 120, and the output of circuit 134 is not connected through switch 135 to lead 37. Thus, no pulse is superimposed upon the ramp voltage in this mode of operation. The output of circuit 142 is not connected through switch 147 to relay driver 148, but is connected to flip-flop 110.

The output of reset generator 94 is connected by lead 93 to delay circuit 102 which generates a signal on lead 108 as shown in FIG. 6(f). The signal on lead 108 will cause flip-flop 110 to generate a voltage level shift which is connected through contact 4 of switch 147 to relay driver 148 to close relay 150. The output signal on lead 144 from bistable 142, generated in response to the sequence of signals shown in FIGS. 4(i) through (s), will reset flip-flop 110 and remove the voltage signal from relay driver 148 so that relay 150 will open, as shown in FIG. 6(g).

As noted above, relay 29 is initially closed and opens in response to a positive going voltage level shift on flip-flop 98, FIG. 6(h), which triggers circuit 55 driving relay driver 56. During the time, e.g., 3 seconds, between hammer operation initiating the growth of a new drop on the dropping electrode 46 and the generation of an output signal from counter 84, the current flowing in the cell 42 has significantly increased, as shown in FIG. 6(l). Relay 29 is opened, FIG. 6(j), at about the same time that counter 84 is triggered, i.e., 3 seconds after a new drop has started to grow on the dropping electrode 46. Upon the opening of relay 29, the ramp voltage is applied to the auxiliary electrode 41 of cell 42 resulting in a change in current flow at indicator electrode 46. It is this change in current flow that is to be measured.

As noted above, relay 122 is normally closed during this mode of operation. Further, relay 150 is closed essentially simultaneously with the hammer action, as shown in FIG. 6(g). The current flowing in the cell during the time interval between hammer action and the time when relay 150 opens, FIG. 6(g), i.e., about 50 msec. after the start of the ramp voltage (FIG. 6(k)), is developed across both capacitors 68 and 69 and the output at 74 is zero. When relay 150 opens, however, capacitor 68 acts as a voltage memorizing unit and stores a voltage representing the current flow at the time relay 150 opens or essentially the time when the ramp voltage is applied to the cell 42. However, since relay 122 remains closed the current flowing in the cell is now represented by an increasing voltage being applied to capacitor 69. Amplifiers 70 and 71, connected in the electrometer mode, apply the voltages stored in capacitors 68 and 69 to amplifier 72 which generates an output voltage representing the difference between the current flow prior to the application of the ramp voltage and the current flow during application of the ramp voltage. Thus, the output at 74 is a signal, FIG. 6(m), representing the current flow which is responsive to the ramp voltage. This output may be connected to a recorder, scope or meter as desired. FIGS. 6(l) and (m) also show the change in current resulting from the inclusion in the cell of a reducible constituent. Similarly, an oxidizable constituent may also be detected. The change 152 which indicates the presence of such a constituent can be easily measured at 74 since the circuit 65 essentially bucks out the high currents present prior to the opening of relay 150.

After the ramp voltage has reached its limit value, as determined by circuit 51, a voltage level shift is generated on lead 54 by bistable 52 in response to the detection of the limit by bistable 49 (see FIG. 6(i)). In response to this voltage level shift, flip-flop 55 is energized (FIG. 6(j)) and limit relay 29 closes to return the voltage at 31 to zero by shorting the capacitor 32. The sequence may again be started by activating push button 85.

Circuit 73 of the selective voltage memorizing circuit 65 is a difference current offset circuit for shifting the output level at 74. A similar offset voltage circuit 149 may also be utilized, see FIG. 1, to avoid saturation of the amplifier 63 should the output of circuit 60 increase to unusually high values.

Normal polarographic mode

In this mode of operation the dropping electrode functions at its natural dropping frequency without control or synchronization. With all nine pole five-position switches located in position No. 2, a ramp voltage is applied to the cell in the manner described above.

In the normal polarographic mode switches 76 and 77, which are connected for simultaneous operation, are in the a position. Thus, none of the circuits in FIG. 2 are operating with the exception of relay driver 56 which is connected through switch 77 to lead 54 of switch 53. Thus, only the voltage ramp limiting function of the system of FIG. 2 is utilized in this operating mode. As a result both relays 122 and 150 are maintained open and the voltage memorizing circuit 65 is not utilized. The voltage, representing the current flowing in the cell, which results from the application of the linear ramp voltage will be present on lead 64a, the envelope being shown in FIG. 7, which is connected to a recorder, scope or meter as desired. The envelope of the voltage-current curve is of the usual form associated with this mode of operation and therefore will not be discussed in detail. This type of operation is included herein, however, to show the operation versatility of the present invention.

Control of the ramp voltage may also be achieved by moving the five-positioned switches to position No. 1 or position No. 3. In position No. 1 switch 30 results in a cuit, a bistable or squaring circuit 112 connected to the A.C. source 113 and a gate circuit 114. The gate control 100, in response to the signal from 84, applies a pulse signal (see FIG. 4(i)) to the gate 114 of about 20 milliseconds width during which time the gate is open. The squaring circuit 112 generates a square wave signal (see FIG. 4(j)) representing the A.C. voltage source frequency. The output of gate 114 is present (see FIG. 4(k)) when the first positive going portion of any square wave from circuit 112 occurs while the control signal from gate control 100 is less negative. Since, for a 60 cycle A.C. source, a positive going pulse portion will occur every 16⅔ milliseconds, at least one positive going portion of the signal from 112 will occur while the control signal from circuit 100 is present. The output pulse from 114, now synchronized with the A.C. ripple present on the voltages used in the system for purposes explained in detail hereinafter, is connected through a univibrator 116 which increases the pulse width (see FIG. 4(l)), and to a bistable or squaring circuit 118 which shapes the pulse to a square pulse as shown in FIG. 4(m).

The output of 118, connected through positions 1–3 of the five-position switch 119, drives a relay driver 120, which controls relay 122 (see FIG. 1) in the voltage memorizing circuit 65, as explained hereinafter. Driver 120 opens relay 122 at the beginning of the pulse output of 118 and allows the relay 122 to close at the end of the pulse output of 118. Circuit 118 is also connected to a univibrator 124 which delays the signal. The output of delay 124 (see FIG. 4(n)) with the positive going pulse portion delayed by about 10 milliseconds after relay 122 opens, is connected through a univibrator 128 (see FIG. 4(o)) and a bistable or squaring circuit 130 to generate a square shaped pulse. Circuit 130 has one output 132 (see FIG. 4(p)) connected through a pulse clipping circuit 134 and positions 1–3 of five-position switch 135 to lead 37. Circuit 134 functions to control the amplitude of the square pulse 36 (FIG. 3(b)) and clamps the output signal to zero. The pulse applied at 132 is a square wave having an amplitude of 20 volts varying between the limits of −12 to +8 volts. The output of circuit 134 is shown in FIG. 4(p).

A complementary output 136 of circuit 130 is connected through a univibrator 138, univibrator 140 functioning as a pulse width control and bistable or squaring circuit 142, the operation of which are the same as circuits 124, 128 and 130, i.e., to provide an output at 144 and 146 which is a square wave. The output 144 (FIG. 4(s)) is used only in the fast sweep mode described hereinafter. The output 146 (FIG. 4(t)) is connected through positions 1–3 of five-position switch 147 to relay driver 148 which controls switch 150 of circuit 65 (see FIG. 1). Switch 150 is closed by the leading edge of the signal on lead 146 and is opened by the trailing edge of the signal.

Referring to FIG. 4, the sequence of operations and time of current measurement are apparent. Switches 22, 23, 26, 30, 53, 86, 119, 135 and 147, connected in a ganged arrangement, are in position No. 2, switch 76 is closed and switch 77 is in position b connecting lead 106 to relay driver 56, switch 40 is contacting auxiliary electrode 41, relay contacts 29, 122 and 150 are open, and switch 81 is connected either to multivibrator 78 or 80, depending upon the speed of operation desired. The linear ramp voltage generated by amplifier 28 is connected to amplifier 35, and the composite signal shown in FIG. 4(u) is applied to auxiliary electrode 41. The hammer is operated by closing switch 95 knocking off the mercury drop of the electrode 46 in response to preset counter 82. At this time the current 58 in the cell starts to increase as shown in FIG. 4(v) due to the growth of a new drop. This current is applied to circuit 65 but no output is generated since both relays 122 and 150 are normally open. At some arbitrary time before the pulse 36 is superimposed upon the ramp voltage, relay 122 is closed and remains closed until about 10 milliseconds before pulse 36 (FIG. 3(b)) and FIG. 4(u) is applied on lead 37. The cell current passing through measuring circuit 60 is converted to a voltage which is developed across capacitor 69 while switch 122 is closed. When relay 122 is opened, i.e., point 57, just prior to pulse 36 the voltage value representing the current passing through the cell at that instant and before application of pulse 36, is stored on capacitor 69.

Upon the application of the pulse 36 to the cell 42 the current changes as shown in FIG. 3(d) and FIG. 4(v). During the duration of the pulse 36, but preferably after the initial current surge, relay 150 closes so that the current passing through the cell, as represented by the voltage across measuring circuit 60, is now developed across capacitor 68 through closed switch 150 and leads 67 and 64. Prior to the termination of pulse 36, relay 150 is opened and the voltage representing the cell current value is stored in capacitor 68. The voltages on capacitors 68 and 69 are applied through high input impedance amplifiers 70 and 71 to a difference amplifier 72 which generates an output signal at 74 representing the difference between points 57 and 58 of the current curve 59, as shown in FIG. 3(d). The measuring circuit 60 includes a plurality of measuring resistors some of which also have response limiting capacitors in parallel electrical arrangement.

As noted above, the output of circuit 118 is synchronized with the A.C. line voltage. The purpose for this is more apparent if FIG. 5 is considered. The voltage applied to cell 42 will have an A.C. ripple component which for most low current measurements may introduce a substantial error. This error is eliminated in the present invention by synchronizing the current measurements with the A.C. ripple. Thus, FIG. 5 shows, in exaggerated form, the current wave form containing an A.C. ripple. It is clear that the measurements represented by point 57 and 58 may be taken at various points on the wave form and, therefore, would include errors resulting solely from the difference in the A.C. ripple component. The present invention, however, provides that the measurement at point 57, representing the time at which relay 122 opens, is taken at a particular point on the A.C. ripple as determined by gate 114. Point 58, representing the time when relay 150 opens and the final measurement is taken, is taken to be exactly 50 milliseconds after the measurement at point 57, so that three complete A.C. ripple cycles take place and the point 58 occurs on the A.C. ripple wave at precisely the same relative location as did the measurement represented by point 57. In this manner the synchronization with the A.C. signal eliminates any error resulting from A.C. ripple and pick-up and provides for increased accuracy of measurement.

The ramp voltage, which is linear and therefore directly proportional to time, continues to increase until it reaches a value set by circuit 51 at which time voltage level detector 49 generates a signal which actuates bistable 52 to generate an output voltage level shift which is applied through switch 53 and contact 54 to flip-flop 55. Flip-flop 98 has already generated an output signal, see FIG. 4(g), prior to the voltage level shift generated by 52 so that a signal is applied on lead 106 to relay driver 56 to close contact 29 in response to the voltage level shift generated by bistable 52. When contact 29 closes, the capacitor 32 is shorted and the voltage output at 31 returns to zero. The system is then ready for another sequence of operation at such time as the preset counter 82 generates an output signal to initiate the next measurement.

Fast sweep mode

The operation in the fast sweep mode requires that switches 22, 23, 26, 30, 53, 86, 119, 135 and 147 be in position No. 4 or 5 depending upon whether anodic or cathodic operation is desired; switch 76 is closed; switch 77 is in position a and connects lead 54 to relay driver 56; switch 40 is contacting electrode 41; relay 122 is closed, since switch 119 is connecting a voltage source 121 to relay driver 120 thereby holding relay 122 in a short circuit connection across capacitor 32 thereby returning the voltage at 31 to zero. In position No. 3 the input signal is disconnected from the amplifier 28 at switch 26 so that the voltage at 31 remains constant.

The switch arrangements for the various modes of operation of this embodiment of the present invention are summarized in Chart I, where the Switch Position column refers to switches 22, 23, 25, 26, 30, 53, 86, 119, 135 and 147.

CHART I

| Switch Position | Operating Mode | | Conditions |
|---|---|---|---|
| 1. Reset | | | 31 at zero. |
| 2. Run | Normal Polarographic. | | Switch 76 open, free electrode drop, output at 64a, 54 connected to 56 through switch 77. |
| | Derivative Pulse. | | Switch 76 closed, timed electrode drop, switches 122 and 150 operating, 106 connected to 56. Output at 74. |
| 3. Hold | | | No ramp voltage increase. |
| 4. Anodic | Fast Sweep | | Switch 76 closed, ramp increasing. Switch 122 closed; Switches 29 and 150 operating. Switch 85 initiates operation. |
| 5. Cathodic | do | | Same as anodic except negative slope ramp voltage. |

Normal pulse mode

Figure 8:
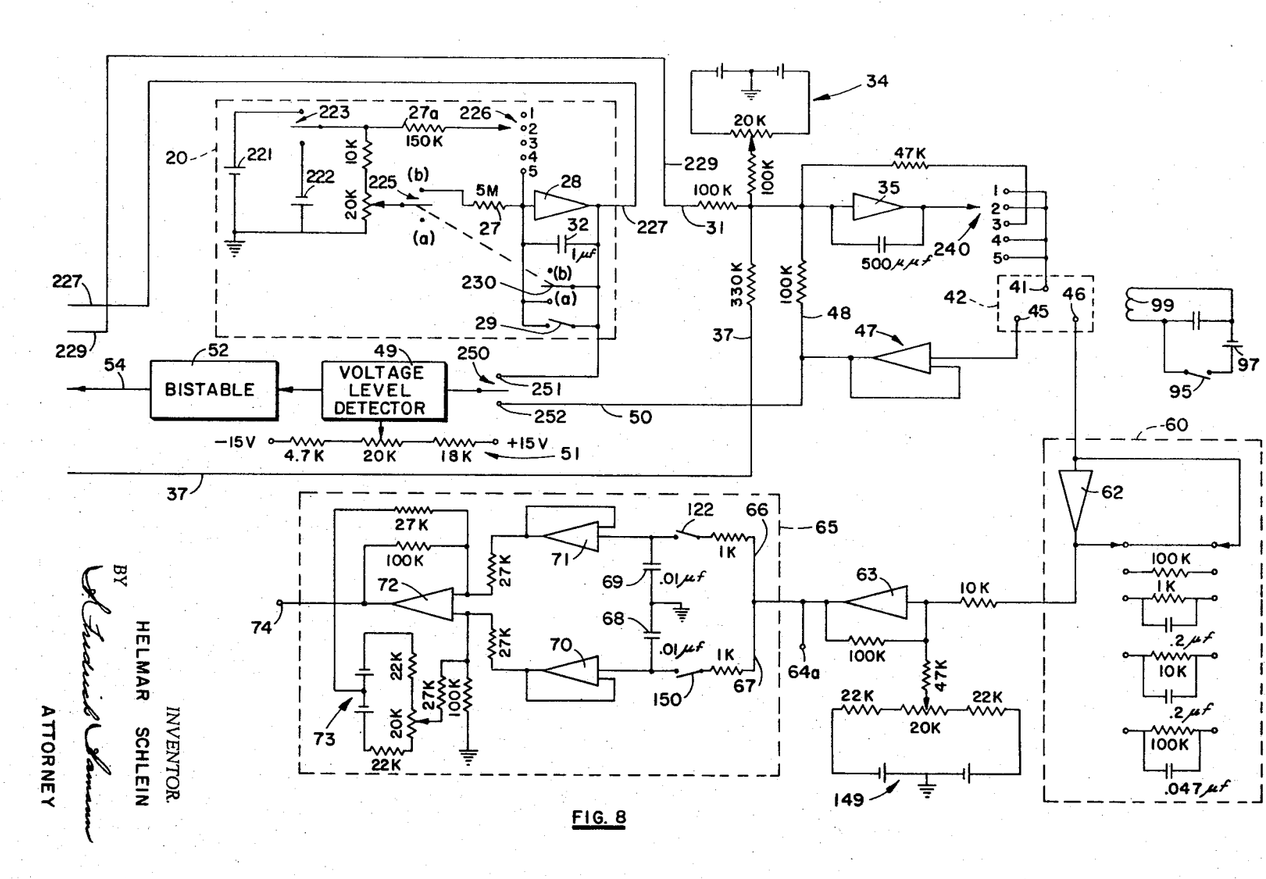
FIGS. 8 and 9 are circuit diagrams of a second embodiment of the present invention.
Figure 9:
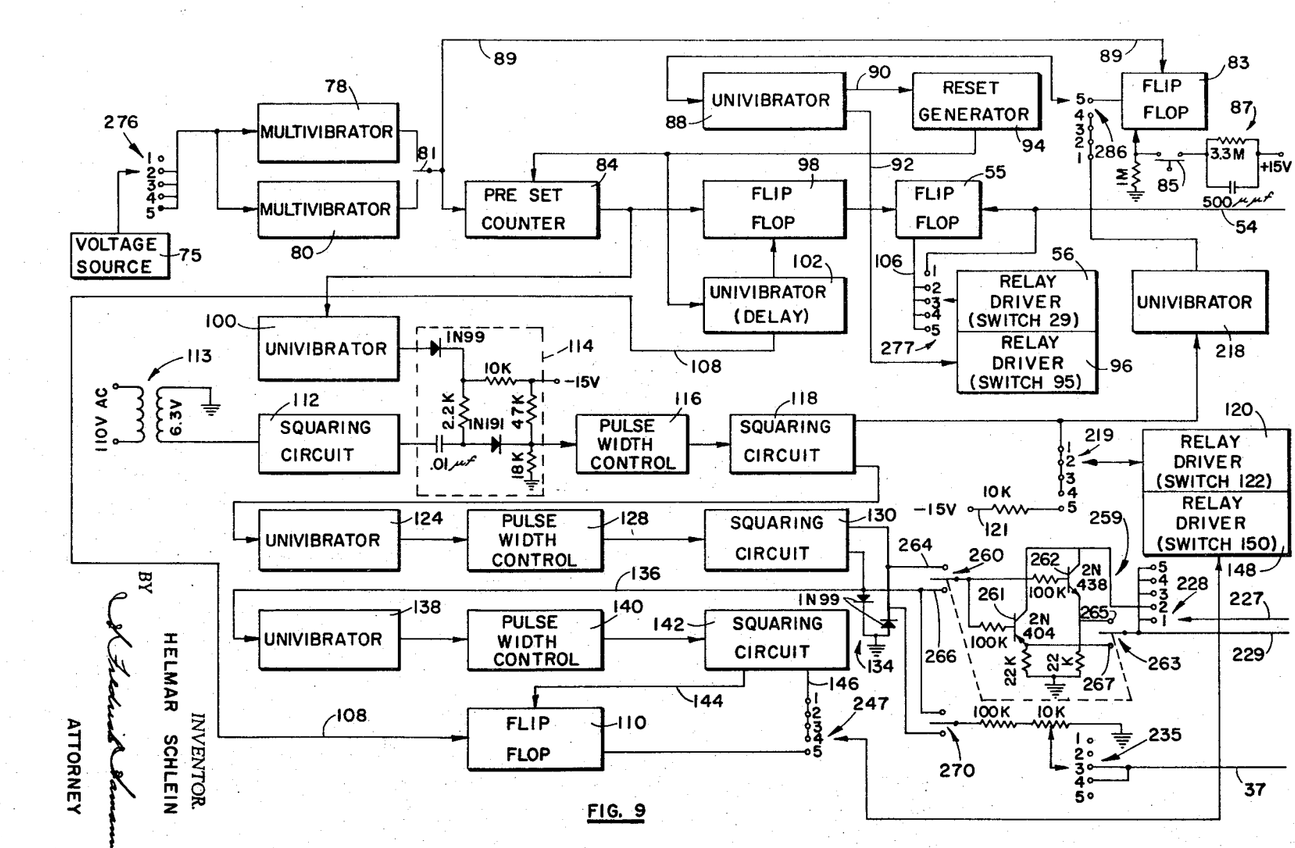

The embodiment of the present invention shown in FIGS. 8 and 9 includes modifications over the embodiment of FIGS. 1 and 2 and provides for operation in any one of the four operating modes, including the normal pulse mode, while maintaining the basic combination of the first embodiment. However, only the normal pulse mode of operation will be described. Referring to FIG. 8 in detail where elements functioning in the same manner as the elements in FIGS. 1 and 2 are identified by the same numbers, a ramp voltage generator 20 includes a pair of voltage sources 221 and 222 connected to opposite terminals of switch 223 so that either a positive or negative voltage may be applied through potentiometer 24 to the movable contacts of switch 225 and switch 226. The operating modes, i.e., normal polarograph, normal pulse, stand-by, derivative pulse and fast sweep, correspond to positions 1–5, respectievly, of switch 226 as well as other five-position switches described hereinafter, all of which are connected for ganged operation. Switch 226 functions only in position 5 and in all other positions switch 225, having a reset position $a$, a hold position (shown) and a run position $b$, controls the application of the voltage to amplifier 28 through resistance 27. Relay contact or switch 29 and capacitor 32 function in the same manner as described above.

The output 227 of ramp voltage source 20 is connected to the movable contact of switch 228 (FIG. 9), so that in any of the modes of operation except the normal pulse mode, output 227 is connected through switch 228 and lead 229 (see FIG. 9) directly to lead 31 (FIG. 8) and to amplifier 35. The output of amplifier 35 is connected through switch 240 to auxiliary electrode 41 of cell 42. Position 3 of switch 240 is a stand-by connection and no voltage signal is applied to cell 42. The measuring circuit 60, offset voltage circuit 149 and selective voltage memorizing circuit 65 function in the same manner as described above.

Switches 223 and 250 are connected for ganged operation so that when the slope of the voltage ramp is inverted the setting of voltage level control 51 need not be changed except to compensate for the magnitude of the pulse present on lead 50. This is more apparent when it is considered that if a positive voltage is applied through switch 223 the voltage ramp on contact 251 of switch 250 will be negative going by virtue of the inverting characteristic of amplifier 28. However, the voltage ramp on contact 252 will be positive going since the negative going ramp at 31 is inverted by amplifier 35 but not by amplifier 47. In this manner, the inversion of the slope of the voltage ramp resulting from the movement of switch 223 also changes the input to voltage level detector 49 by virtue of the movement of switch 250. Detector 49 and bistable 52 function as described above and the output 54 of bistable 52 is connected to flip-flop 55. Switch 277 (FIG. 9) connects the output of flip-flop 55 to relay driver 56 in positions 2–5 of switch 277, while position 1 bypasses flip-flop 55 so that switch 29, controlled by relay driver 56, can be operated in the normal polarographic mode, in which mode flip-flop 55 is inoperative to pass a signal from lead 54 to lead 106.

The controller of FIG. 9 utilizes only one preset counter 84 and is arranged to operate the hammer switch 95 through relay driver 96 one second after the pulse has been superimposed on the ramp voltage and applied over lead 37 to the cell 42. In the derivative pulse mode, i.e., position 4 on switches 219, 226, 235, 240, 247, 276, 277 and 286, the output of squaring circuit 118, is connected through univibrator 218 and switch 286 to univibrator 88. The output 92 of univibrator 88 drives relay driver 96, with univibrators 218 and 88 functioning as delaying circuits. In this embodiment univibrator 218, introducing a delay of about 1 sec., is used in the activation of the hammer switch 96 and preset counter 84 is reset at the time of hammer operation through univibrators 218, 88 and reset generator 94. The sequence of operation of switches 122 and 150 remains as in the previous embodiment except for the normal pulse mode, switch position 2.

In the normal pulse mode the signal applied to the cell is a series of pulses of uniformly increasing magnitude, as shown in FIG. 10, which can be either of positive or negative polarity. The operation of the various elements described above is unchanged except to the following extent. In this mode of operation the complementary signal outputs of circuit 130 are connected to the terminals of switch 260, the movable contact of which is connected to the base of each of the transistors 261 and 262 of the selective gating circuit 259. The position of switch 260 determines the polarity of the pulses and is ganged with the movable contact of switch 263 so the circuit between lead 227 and lead 229 now passes through either transistor 261 or 262 to terminal 2 of switch 228. Contact 264 of switch 260 connects positive pulses to the base of transistors 261 and 262, but only transistor 262 having its emitter connected to terminal 265 is connected through switch 263 to lead 229. The negative going voltage ramp present on lead 227 is gated by transistor 261 so that only portions of the ramp voltage are impressed upon lead 229. Through inverting amplifier 35 these negative portions of the ramp voltage are inverted (see FIG. 10) and impressed upon the cell 42. In the same manner when switch 260 connects contact 266 (negative going pulses) from circuit 130, and contact 267 is connected by switch 263 to lead 229, transistor 262 functions to gate a positive going voltage ramp. Switches 260 and 263 are ganged for operation with switches 223 and 250 (see FIG. 8) so that the proper switch position is provided depending upon the slope of the voltage ramp. In this manner selective gating circuit 259 provides voltage pulses of uniformly increasing magnitude and of either positive or negative polarity and the initiation and termination of these pulses are synchronized with the A.C. source and with the hammer operation. Thus, the voltage representing the current flowing in the cell 42 is measured at points 57 and 58, see FIG. 10, for each of the series of pulses of changing magnitude and an envelope similar to FIG. 7 is obtained. The selective gating circuit 259 may also utilize a single transistor, e.g., 262, together with an inverting amplifier where the amplifier is connected into the circuit to provide a series of negative going pulses.

The pulses from circuit 130 are clamped to zero by circuit 134 so that positive and negative pulses may be applied through the opposite terminals of switch 270 to potentiometer 271. The wiper of potentiometer 271 is connected through switch 235 to lead 37. In this manner either a positive or negative voltage pulse of variable amplitude may be superimposed upon the ramp voltage at 31.

The switch arrangements for the various modes of operation of this embodiment of the present invention are summarized in Chart II, where the Switch Position column refers to switches 219, 226, 228, 235, 240, 247, 276, 277 and 286. Switches 225 and 230 must be in *b* position for output signals to be generated in any of the operating modes. The anodic or cathodic mode for switch positions 1, 2, 4 and 5 is selected by appropriately positioning ganged switches 223, 250, 260 and 263.

CHART II

| Switch Position | Operating Mode | Conditions |
| --- | --- | --- |
| 1. Normal Polarograph. | Free-running | Free electrode drop; output at 64a, 54 connected to 56 through switch 277, 227 connected directly to 229, no pulse on 37. |
| 2. Normal Pulse | Increasing Pulse Amplitude. | Timed electrode drop, no pulse on 37, increasing pulses applied on 229. |
| 3. Stand-by | | No voltage applied to cell. |
| 4. Derivative Pulse | Slow Sweep-pulse | Timed electrode drop. Pulses generated on 37, switch 270 selects polarity of pulses. |
| 5. Fast Sweep | Fast Sweep | Switch 122 closed, switches 29 and 150 operating. Switch 85 initiates operation. |

The above described preferred embodiments have utilized a dropping mercury electrode in accordance with standard polarographic practice. However, the present invention may also utilize solid electrodes, or other electrodes commonly utilized in electrochemical analysis systems, in place of the dropping mercury electrode if desired. When solid electrodes are utilized as the working electrode 41 the operation is identical to that described above except that no timed electrode drop is utilized. Thus, relay driver 95 may be disconnected from the working electrode. In each mode of operation discussed the use of a solid electrode will result in an output of substantially similar form as that of the system using a dropping electrode.

In view of the above description, it is apparent that the present invention comprises an electrochemical analysis system utilizing a cell having an indicator electrode, which may be of the solid or dropping mercury type, and an auxiliary electrode. A plurality of signals are generated by the system controller and one or more are selected as the polarizing signal, depending upon the operating mode desired, and applied to the auxiliary electrode. The indicator electrode is connected to a monitoring circuit which monitors the current flow change in the cell resulting from the applications of the polarizing signal. The change in current is measured at precise times before and during the application of the polarizing signal, where these times are controlled by one or more of a plurality of signals generated in the controller. The particular signal which controls the time of monitoring will depend upon the operating mode selected, except in the normal polarographic mode in which essentially none of the functions of the controller are utilized. In the normal pulse mode switches 122 and 150 are controlled by the pulses generated at 118 and 142, respectively, and the polarizing voltage is the ramp voltage gated by the pulse output at 130. In the derivative pulse mode switches 122 and 150 operate in the same manner and in response to the same pulses as in the normal pulse mode, however, the polarizing voltage is an addition of the ramp voltage and the pulse generated by 130. These last two modes provide for combining the ramp voltage and a pulse either by addition or by gating. In the fast sweep mode of operation the switch 122 is held closed by the signal generated by 121. However, switch 150 closes and opens in response to a signal from circuit 142 and a signal from 102 through circuit 110. Thus, a variety of different signals are utilized in controlling the timed operation of the monitoring circuit depending upon the mode selected.

Although particular embodiments of the present invention have been described, various modifications will be apparent to those skilled in the art without departing from the scope of the invention. Further, the circuit values and component identifications shown are exemplary only and substitutions and modifications will be apparent to those skilled in the art. The multivibrators 78, 80, preset counters 82, 84, bistables 49, 52, 112, 118, 130 and 142, univibrators 88, 100, 102, 116, 124, 128, 138, 140 and 218, reset generator 94 and RS flip-flops 55, 83, 98 and 110 are electronic circuits known in the art and therefore have not been shown or described in detail. Therefore, the present invention is not limited to the specific embodiments disclosed but only by the appended claims.

What is claimed is:

1. An electrochemical analysis system having a cell with an auxiliary electrode, an indicator electrode and a reference electrode, comprising in combination means for generating a plurality of voltage signals, means for selecting at least one of said signals and applying said signal to said auxiliary electrode, means including a connection to said indicator electrode for monitoring the change in current in the cell associated with said applied signal, and means responsive to said first named means for controlling the operation of said monitoring means in timed relation to the application of said voltage signal.

2. The system of claim 1 wherein said indicator electrode is a dropping mercury electrode, and including means responsive to at least one of said plurality of signals for controlling the timing of the mercury drop.

3. The system of claim 1, wherein said controlling means is synchronized with an alternating current source.

4. An electrochemical analysis system having a cell with a dropping electrode, an auxiliary electrode and a reference electrode, comprising in combination first means for generating a first signal for controlling the timing of the drop from said dropping electrode, second means responsive to said first means for generating and applying a polarizing signal to said auxiliary electrode at a predetermined variable time after each drop, and third means, including a connection to said indicator electrode, for monitoring the change in current in the cell a predetermined time before and during said polarizing signal.

5. The system of claim 4 wherein said second means includes means for generating a ramp voltage and means for generating a voltage pulse, and means responsive to said voltage pulse for modifying said ramp to generate said polarizing signal.

6. The system of claim 4 wherein said second means includes means for generating a ramp voltage, said generating means being responsive to said first means to initiate said voltage ramp and being responsive to a voltage level detecting means for terminating said ramp voltage.

7. The system of claim 4 wherein said first means includes manual means for initiating said first signal.

8. The system of claim 4 wherein said first means includes means for generating a series of pulses, means responsive to a selectively variable number of said pulses for generating a signal, and electrode drop control means responsive to said signal for knocking off said drop.

9. The system of claim 4 wherein said first means includes means for generating a first signal, means for delaying said first signal, and electrode drop control means responsive to said delayed signal for knocking off said drop.

10. An electrochemical analysis system having a cell with a dropping electrode, an indicating electrode and a reference electrode, comprising in combination first means for generating a signal controlling the timing of the electrode drop, second means including a reference electrode responsive to said first means for generating and applying a stabilized polarizing signal to the dropping electrode at a predetermined variable time after each drop, and third means for monitoring the change in current in the cell which is associated with said applied signal, said second means including means for synchronizing said monitoring means with an alternating current signal.

11. An electrochemical analysis system having a cell with an auxiliary electrode, a reference electrode and a dropping mercury electrode comprising in combination first means for generating a timing signal, second means responsive to said timing signal for generating and applying a polarizing signal to said auxiliary electrode, said second means including a ramp voltage generator means, and third means connected to said dropping electrode and responsive to said timing signal for monitoring the difference between the current flowing in the cell a predetermined time before and during said polarizing signal, said monitoring times being controlled by said second means.

12. An electrochemical analysis system having a cell with a dropping electrode, an auxiliary electrode and a reference electrode comprising first means for controlling the timing of the drop of said dropping electrode, second means responsive to said first means for generating and applying a signal to said auxiliary electrode at a predetermined time after each drop and for generating initial and final signals, third means connected to said dropping electrode and responsive to said initial and final signals for monitoring the change in current in the cell a predetermined time before and during said applied signal.

13. The system of claim 12 wherein said second means includes means for generating a ramp voltage, and wherein said applied signal includes said ramp voltage.

14. A system in accordance with claim 12 wherein said initial and final signals are synchronized with an A.C. signal.

15. An electrochemical analysis system having a cell with a dropping electrode, an auxiliary electrode and a reference electrode, comprising in combination first means for controlling the timing of the electrode drop; second means responsive to said first means for generating a series of pulses of uniformly changing magnitude, said second means including means for generating a ramp voltage, means for generating a pulse signal, means for gating said ramp voltage with said pulse signal to generate said series of pulses, and means for applying said series of said pulses in sequence to said auxiliary electrode, each of said series of pulses being applied at a constant time after each drop; and third means for monitoring the change in current in the cell which is associated with each of said applied pulses.

16. The system in accordance with claim 15 wherein each of said pulses of said series are synchronized with an A.C. signal.

17. An electrochemical analysis system having a cell with a dropping electrode, an auxiliary electrode and a reference electrode, comprising in combination first means for controlling the timing of the electrode drop, second means responsive to said first means for generating a plurality of signals and for selectively applying at least one of said signals to the cell at a predetermined variable time after each drop, and third means for monitoring the change in current in the cell which is associated with said applied signal, said third means including a connection to said dropping electrode for monitoring the current passing through the cell prior to said applied signal and at a predetermined time after the initial application of said signal, said third means generating an output signal representing the difference between said monitored currents, said second means including means for controlling the time of monitoring said currents so that said monitoring is synchronized with an alternating current signal.

18. Means for operating an electrochemical analysis cell having a dropping electrode, an auxiliary electrode and a reference electrode comprising means for generating a first signal at the same frequency as the dropping frequency of said dropping electrode, means responsive to said first signal for generating a second signal a predetermined variable time after said first signal, means for generating a ramp voltage, means for combining said second signal with said ramp voltage and applying said combined signal to the auxiliary electrode, means for including a connection to the dropping electrode for monitoring current flowing in the cell at a first time before said combined signal is applied to the cell and for monitoring current flow in the cell at a second time during said combined signal, and means for controlling said first and second monitoring times and synchronizing said monitoring with an A.C. wave form.

19. The apparatus of claim 18 wherein the difference between said first and second times is an integral number of cycles of said A.C. wave form.

20. The apparatus of claim 18 including means for automatically de-energizing said voltage ramp generating means when said ramp voltage reaches a preselected limit value, said automatic means including a connection to the reference electrode.

21. A controller for use in operating a polarographic cell incorporating a dropping electrode, an auxiliary electrode and a reference electrode, comprising means for generating a ramp voltage, means for generating a square wave pulse of the same frequency as the dropping frequency of said dropping electrode and delayed a predetermined time after said drop, means for adding said square wave pulse to said ramp voltage and applying the resultant signal to the auxiliary electrode so that the current flow in said cell is changed, monitoring means including a connection to the dropping electrode for generating an output signal proportional to the difference between the current flowing in the cell at a time prior to application of the square wave pulse and the current flowing in the cell at a time during the application of the square wave pulse, and means for synchronizing said monitoring means with an alternating current wave form so that the monitored current difference is independent of an A.C. voltage ripple.

22. Polarographic apparatus having a cell with a dropping electrode, a reference electrode and an auxiliary electrode comprising in combination first means for generating a series of timing signals, second means responsive to said first means for generating a second signal, third means responsive to said second signal for controlling the dropping frequency of the dropping electrode, fourth means responsive to said first means and said second means for generating a fourth pulse a predetermined time after said second signal, fifth means for generating a ramp voltage, sixth means including a connection to the reference electrode for detecting a limiting voltage of said ramp, seventh means for applying said ramp voltage to said cell, eighth means including a connection to the dropping electrode for monitoring the change in current passing through said cell, ninth means responsive to said fourth means and said sixth means for controlling the starting and stopping of said ramp voltage, tenth means for generating a control pulse in response to said fourth pulse which is synchronized with an A.C. wave form, eleventh means for energizing said eighth means so said eighth means takes an initial measurement, twelfth means responsive to said control pulse for generating a square pulse, and thirteenth means responsive to said square pulse for energizing said eighth means to take a final measurement, said final measurement being a predetermined time after said initial measurement.

23. The apparatus of claim 22 including means for adding said square wave to said ramp voltage.

24. Polarographic apparatus having a cell with a dropping electrode, a reference electrode and an auxiliary electrode comprising in combination multivibrator means for generating a series of timing pulses of preselected frequency, counter means responsive to said timing pulses for generating a second signal at predetermined variable time intervals, third means responsive to said second signal for dislodging a drop from the dropping electrode, second counter means responsive to said timing pulses and said second signal for generating a second timing pulse a predetermined variable time after said second signal, ramp voltage generator means connected to said auxiliary electrode and including means for detecting a preselected maximum ramp voltage, said detecting means including a connection to the reference electrode, voltage memorizing means including a connection to the dropping electrode for monitoring the current passing through said cell, means connected to said ramp voltage generator means and responsive to said second counter means and said maximum voltage detecting means for starting and stopping said ramp voltage generator means, means responsive to said second timing pulse for synchronizing a control pulse with an A.C. wave form, means responsive to said control pulse for energizing said voltage memorizing means to monitor the initial current flowing in said cell, pulse generating means responsive to said control pulse and connected to said cell so that said generated pulse is superimposed on said ramp voltage, and means responsive to said control pulse to energize said voltage memorizing means to monitor the current flowing in said cell during the duration of said generated pulse, said final measurement being a predetermined whole number of cycles of said A.C. wave form after said initial measurement.

References Cited

UNITED STATES PATENTS

| | | | |
|---|---|---|---|
| 2,246,981 | 6/1941 | Matheson et al. | 204—195 |
| 2,343,885 | 3/1944 | Coleman | 324—31 |
| 2,766,423 | 10/1956 | Barker | 324—31 |

OTHER REFERENCES

Kolthoff et al.: "Polarography," vol. 1, 1952, pp. 334, 399–403.

ROBERT K. MIHALEK, *Primary Examiner.*

T. TUNG, *Assistant Examiner.*

U.S. Cl. X.R.

204—1; 324—31